(12) United States Patent
Endo

(10) Patent No.: US 8,499,130 B2
(45) Date of Patent: Jul. 30, 2013

(54) INFORMATION PROCESSING APPARATUS, INFORMATION PROCESSING METHOD, AND RECORDING MEDIUM THAT RECORDS HISTORY INFORMATION CONTROL PROGRAM

(75) Inventor: Masashi Endo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 706 days.

(21) Appl. No.: 12/404,499

(22) Filed: Mar. 16, 2009

(65) Prior Publication Data

US 2009/0240747 A1    Sep. 24, 2009

(30) Foreign Application Priority Data

Mar. 19, 2008  (JP) .................................. 2008-072286

(51) Int. Cl.
*G06F 12/00* (2006.01)
*G06F 17/30* (2006.01)
(52) U.S. Cl.
USPC ................... 711/162; 711/111; 711/E12.001; 707/672; 707/682; 707/E17.005
(58) Field of Classification Search
None
See application file for complete search history.

(56) References Cited

U.S. PATENT DOCUMENTS

| 4,084,231 A  *  | 4/1978 | Capozzi et al. ............... 711/117 |
| 4,733,349 A  *  | 3/1988 | Sumiyoshi et al. ........... 711/159 |
| 6,209,001 B1    | 3/2001 | Takahashi |
| 7,542,618 B2 * | 6/2009 | Kang et al. ..................... 382/254 |
| 2007/0070401 A1 * | 3/2007 | Okamoto et al. ............ 358/1.15 |
| 2007/0198176 A1 * | 8/2007 | Endo et al. .................... 701/208 |

FOREIGN PATENT DOCUMENTS

| JP | 3-179543 | 8/1991 |
| JP | 11-053123 | 2/1999 |
| JP | 2000-089917 | 3/2000 |
| JP | 2002-049534 | 2/2002 |
| JP | 2002-297427 | 10/2002 |
| JP | 2003-84995 | 3/2003 |

OTHER PUBLICATIONS

Japanese Office Action issued Oct. 23, 2012 in corresponding Japanese Patent Application No. 2008-072286.

* cited by examiner

*Primary Examiner* — Reginald Bragdon
*Assistant Examiner* — Daniel Bernard
(74) *Attorney, Agent, or Firm* — Staas & Halsey LLP

(57) ABSTRACT

A method and an apparatus include storing history information into a first storage section that accumulates history information concerning a process performed, transmitting a received acquisition request of the history information accumulated into the first storage section, transmitting the accumulated history information to the history information accumulation section having transmitted the acquisition request, transmitting the history information to the another history information accumulation section, transmitting the acquisition request to the first history information accumulation section at a time of startup, and storing the transmitted history information into a second storage section.

6 Claims, 13 Drawing Sheets

FIG. 4

| LOG INFORMATION | INFORMATION SOURCE | ACQUISITION DATE AND TIME |
|---|---|---|
| VOLTAGE ABNORMALITY | POWER SUPPLY UNIT 00 | 2008/3/3 |
| APPLICATION ABNORMAL TERMINATION | IOU | 2008/3/5 |
| ... | ... | ... |

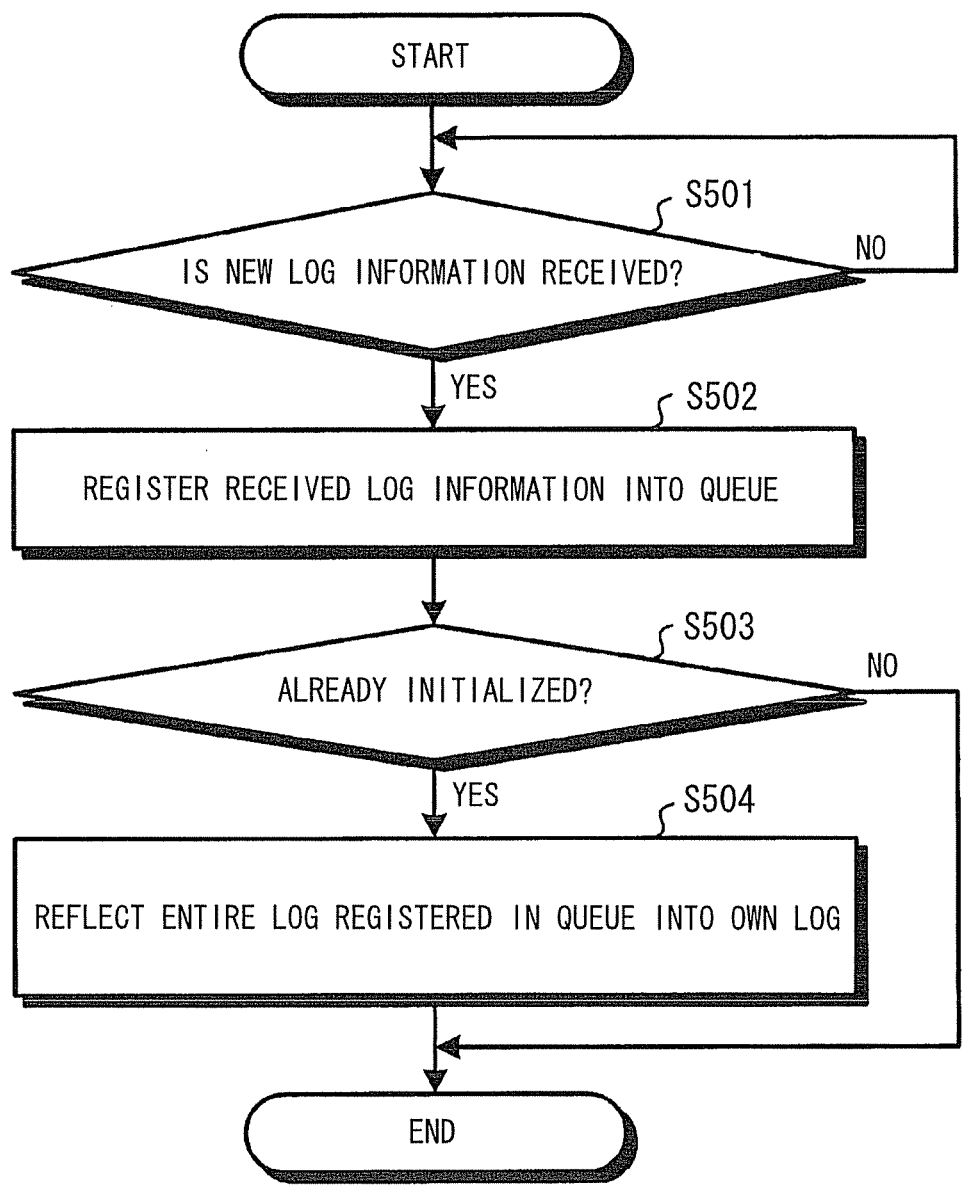

INFORMATION PROCESSING APPARATUS, INFORMATION PROCESSING METHOD, AND RECORDING MEDIUM THAT RECORDS HISTORY INFORMATION CONTROL PROGRAM

CROSS-REFERENCE TO RELATED APPLICATIONS

This application claims the benefit of Japanese Patent Application No. 2008-72286, filed on Mar. 19, 2008, the disclosure of which is incorporated herein by reference.

FIELD

An embodiment of the present invention relates to an information processing apparatus and method thereof.

BACKGROUND

In the prior art, various kinds of backup techniques have been discussed (JP-A-2000-89917, JP-A-2002-49534, JP-A-2002-297427, and JP-A-H11-53123). For example, in an information processing apparatus provided with a processing section for performing a predetermined processing and a log information accumulation section having a storage section for accumulating log information which is the log of the processing section, a technique is known in which log information is multiplexed and synchronously recorded into a plurality of log information accumulation sections.

For example, in the information processing apparatus, the log information accumulation sections are composed of a log information accumulation section of an operation system for acquiring log information from the processing section and storing the information into a storage section; and a log acquisition apparatus of a standby system for acquiring the log information acquired by the log information accumulation section of operation system, and storing the information into a storage section. Further, in this information processing apparatus, a technique is employed that at the time of synchronizing the log information, the log information accumulation section of operation system monitors the startup timing of the standby-system log information accumulation section.

That is, in the prior art information processing apparatus, the operation-system log information accumulation section always monitors whether the standby-system log information accumulation section has started up. Then, when a monitoring result that the standby-system log information accumulation section has started up is obtained, the operation-system log information accumulation section transmits the acquired log information to the standby-system log information accumulation section.

Then, the standby-system log information accumulation section stores into the storage section the log information transmitted from the operation-system log information accumulation section. As a result, synchronization is established between the log information stored in the operation-system log information accumulation section and the log information stored in the standby-system log information accumulation section.

Meanwhile, in the above-mentioned technique, the operation-system log information accumulation section needs to monitor whether the standby-system log information accumulation section has started up. This has prevented reduction of processing load of synchronization.

For example, in the prior art technique, the operation-system log information accumulation section always monitors whether the standby-system log information accumulation section has started up. Then, only when the startup is confirmed, log information is transmitted to the standby-system log information accumulation section. Thus, in the prior art the information processing apparatus, log information synchronization cannot be achieved without the necessity of monitoring whether the standby-system log information accumulation section has started up. This has prevented reduction of processing load of synchronization. Here, the above-mentioned Patent Documents do not disclose a technique of synchronization processing without monitoring.

SUMMARY

According to an embodiment of the invention, a method and apparatus are provided for processing information. According to an embodiment a method that controls an information processing apparatus including storing history information acquired from a processing section into a first storage section provided in a first history information accumulation section that accumulates history information concerning a process performed by a processing section, transmitting a received acquisition request of the history information accumulated into the first storage section, transmitting the accumulated history information to another history information accumulation section having transmitted the acquisition request, transmitting the history information to the other history information accumulation section, transmitting the acquisition request to the first history information accumulation section at a time of startup, and storing the transmitted history information into a second storage section provided in a second history information accumulation section.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 illustrates an example of log information;

FIG. 11 illustrates a flow chart of a new log information storing process performed by an information processing apparatus.

DESCRIPTION OF EMBODIMENTS

Figure 1:
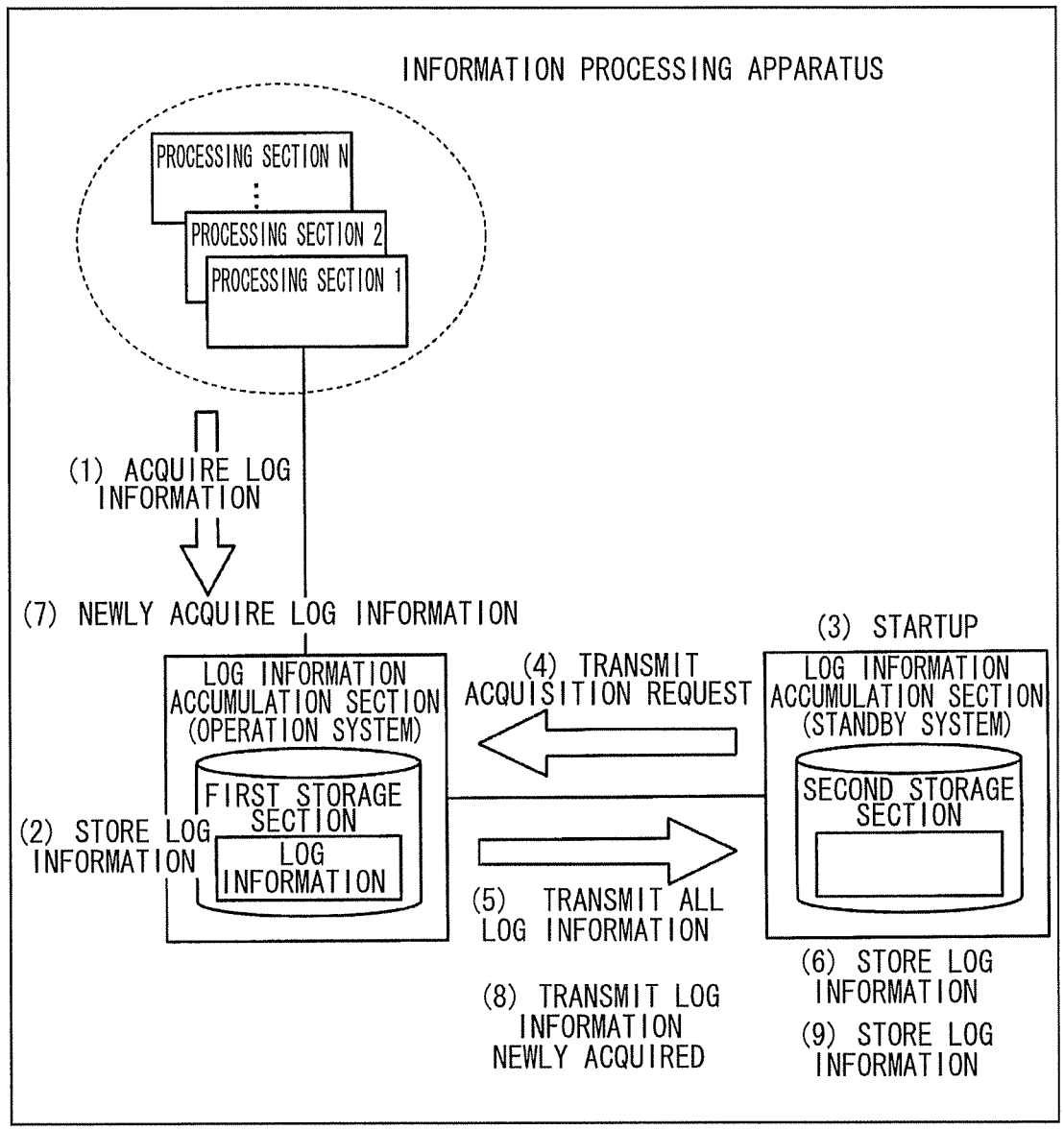
FIG. 1 illustrates a diagram of an information processing apparatus according to an embodiment the invention.

Reference will now be made in detail to the embodiments, examples of which are illustrated in the accompanying drawings, wherein like reference numerals refer to the like elements throughout. The embodiments are described below to explain the present invention by referring to the figures.

Embodiments of an information processing apparatus are described below with reference to the accompanying drawings.

FIG. 1 illustrates an information processing apparatus according to an embodiment of the invention.

As illustrated in FIG. 1, the information processing apparatus according to an embodiment includes a processing section that performs a (certain) process, and a log information accumulation section including a storage section that accumulates log information of the process performed by the processing section. The log information is an example of history information.

The log information accumulation section, in other words, a monitor unit, is installed in the information processing apparatus. The log information accumulation section acquires log information from the processing section such as a system board and an IO unit provided in the information processing apparatus. While a few examples of a processing section is provided, the present invention is not limited to acquiring processing information from any particular section. Instead, the present invention may acquire information of processing(s) from any system, processor, computer, and/or device that performs specialized or general operation(s).

The log information indicates a state of the information processing apparatus. A log concerning a processing section provided in an information processing apparatus, for example, such as a main (business) server may correspond to the "log information" mentioned here. An example of the "log information" is a log that indicates presence or occurrence of abnormality in the processing section.

The information processing apparatus illustrated in FIG. 1 has N processing sections, processing section 1 to processing section N, and two log information accumulation sections. Further, the information processing apparatus has an operation-system log information accumulation section and a standby-system log information accumulation section that serve as log information accumulation sections.

The operation-system log information accumulation section indicates a log information accumulation section that is presently acquiring log information from the processing section as illustrated in part (1) of FIG. 1. In the example illustrated in FIG. 1 (1), the operation-system log information accumulation section acquires log information concerning each processing section from each of the processing sections 1 to N.

As illustrated in FIG. 1 (2), the operation-system log information accumulation section stores log information newly acquired from any of the processing section into a first storage section serving as a storage section provided in the operation-system log information accumulation section. In the example illustrated in FIG. 1 (2), the operation-system log information accumulation section stores the log information acquired from each of the processing sections 1 to N into the first storage section.

The standby-system log information accumulation section acquires log information from the operation-system log information accumulation section. The standby-system log information accumulation section illustrated in FIG. 1 acquires the log information stored in the first storage section from the operation-system log information accumulation section, and stores the acquired information into the second storage section provided in the standby-system log information accumulation section.

As illustrated in FIG. 1 (3), the standby-system log information accumulation section starts up. Then, as illustrated in FIG. 1 (4), the standby-system log information accumulation section transmits an acquisition request for log information to the operation-system log information accumulation section. The "acquisition request" indicates that the standby-system log information accumulation section requests the acquisition of log information accumulated into the first storage section by the operation-system log information accumulation section. An example of the "acquisition request" is a request for acquiring all log information accumulated in the first storage section issued at a point in time that the standby-system log information accumulation section transmits an acquisition request, or alternatively at a point in time that the acquisition request is received by the operation-system log information accumulation section.

As illustrated in FIG. 1 (5), in the information processing apparatus, the operation-system log information accumulation section transmits all log information. When receiving an acquisition request from the standby-system log information accumulation section serving as another log information accumulation section, the operation-system log information accumulation section transmits the log information accumulated in the first storage section to the standby-system log information accumulation section having transmitted the acquisition request.

As illustrated in FIG. 1 (6), in the information processing apparatus, the standby-system log information accumulation section stores the log information received from the operation-system log information accumulation section. The standby-system log information accumulation section stores all log information transmitted from the operation-system log information accumulation section in response to an acquisition request, into a second storage section provided in the standby-system log information accumulation section.

In the information processing apparatus, when the operation-system log information accumulation section newly acquires log information from the processing section as shown in FIG. 1 (7), the operation-system log information accumulation section transmits the newly acquired log information to the standby-system log information accumulation section as illustrated in FIG. 1 (8).

In the information processing apparatus, as illustrated in FIG. 1 (9), the standby-system log information accumulation section stores the log information newly transmitted from the operation-system log information accumulation section. That is, the standby-system log information accumulation section stores the log information newly acquired by the operation-system log information accumulation section into the second storage section and transmitted to the standby-system log information accumulation section.

As described above, in the information processing apparatus, without monitoring whether the standby-system log information accumulation section has started up, the operation-system log information accumulation section may synchronize the data stored in the operation-system log information accumulation section with the data stored in the standby-system log information accumulation section. Thus, in the information processing apparatus according to an embodiment, the processing load of synchronization of data can be reduced.

The information processing apparatus illustrated in FIG. 1 is further described below with reference to FIGS. 2 to 6. Description is given below of a configuration of an information processing apparatus, a hardware configuration of a log information accumulation section, and a configuration of software of the log information accumulation section. The following description is given for a case that the information processing apparatus has one operation-system log information accumulation section and one standby-system log information accumulation section. However, the present invention is not limited to this configuration. The information processing apparatus may have a plurality of standby-system log information accumulation sections.

Figure 2:
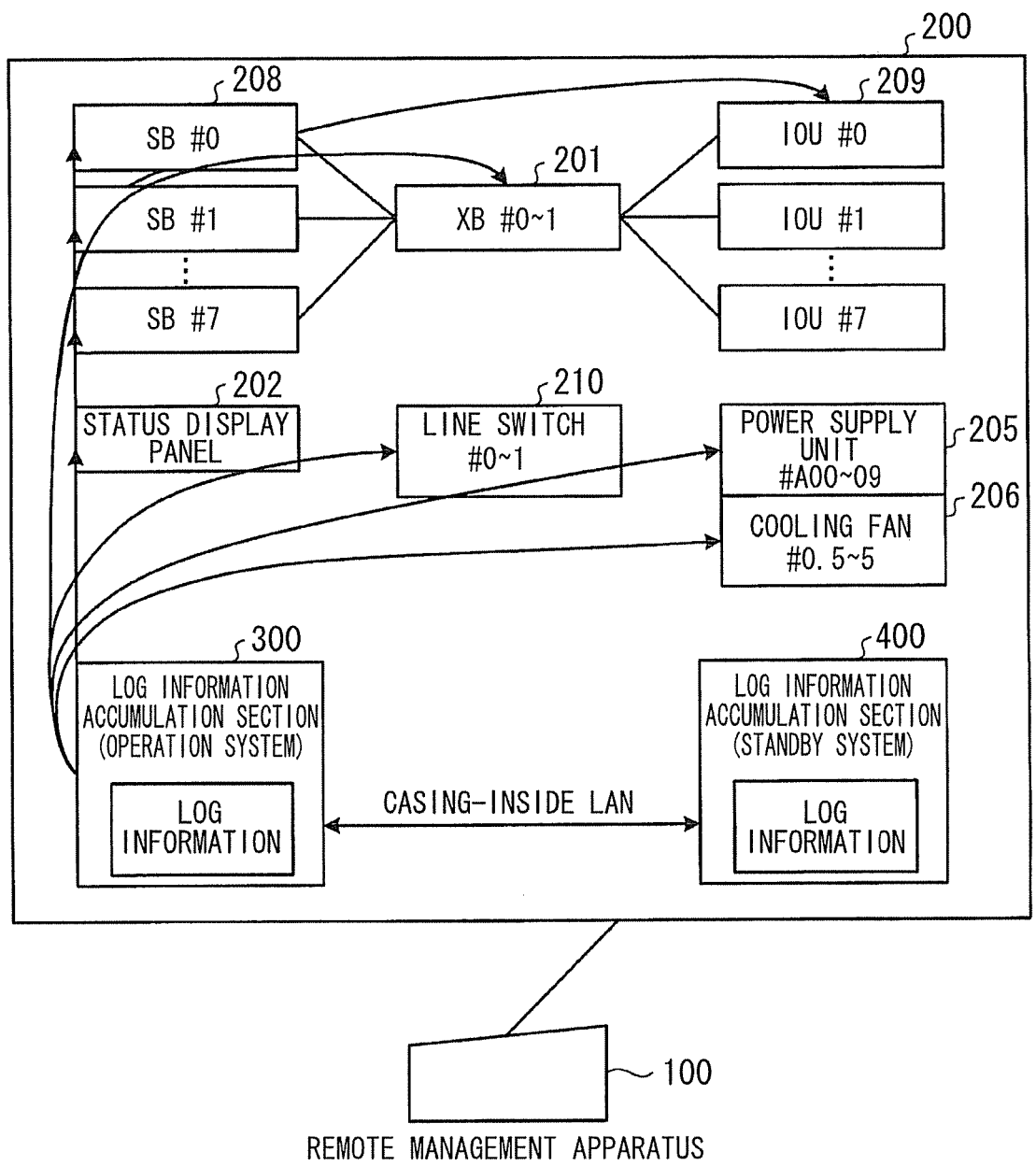
FIG. 2 illustrates a block diagram of an information processing apparatus.

The configuration of the information processing apparatus is described below with reference to FIG. 2. FIG. 2 is a block diagram illustrating a configuration of an information processing apparatus according to an embodiment. As illustrated in FIG. 2, the information processing apparatus 200 has a crossbar board (XB) 201 and a status display panel 202. The information processing apparatus 200 has a power supply unit 205 and a cooling fan 206. The information processing apparatus 200 further has a system board (SB) 208, an IO unit (IOU) 209, and a line switch 210.

The information processing apparatus 200 has a plurality of log information accumulation sections. In FIG. 2, the information processing apparatus 200 has one operation-system log information accumulation section 300 and one standby-system log information accumulation section 400.

As illustrated in FIG. 2, the information processing apparatus 200 has a plurality of power supply units 205 and a plurality of cooling fans 206. The information processing apparatus 200 has two XBs 201 and two line switches 210. However, the present invention is not limited to any particular number of components.

The information processing apparatus 200 has an operation-system log information accumulation section 300 and a standby-system log information accumulation section 400 that serve as log information accumulation sections. The XBs 201, the status display panel 202, the power supply unit 205, the cooling fan 206, the SBs 208, the IOUs 209, and the line switches 210 are individually (directly) connected only to the operation-system log information accumulation section 300, but not connected to the standby-system log information accumulation section 400. Further, the information processing apparatus 200 is connected to a remote management apparatus 100 for managing the information processing apparatus 200.

As illustrated in FIG. 2, an embodiment describes for a case that the XBs 201, the status display panel 202, the power supply unit 205, the cooling fan 206, the SBs 208, the IOUs 209, the line switches 210, and the log information accumulation section are provided inside the information processing apparatus 200. In an embodiment, the remote management apparatus 100 is located outside the information processing apparatus 200.

The following description is given under the assumption that the XBs 201, the status display panel 202, the power supply unit 205, the cooling fan 206, the SBs 208, the IOUs 209, and the line switches 210 individually serve as processing sections for performing certain (predetermined) processing.

The XBs 201 are connected with the SBs 208, the IOUs 209, and the operation-system log information accumulation section 300. The XBs 201 connects each of the plurality of SBs 208 to each of the plurality of IOUs 209 in one-to-one correspondence, and controls data transfer between each of the SBs 208 and each of the IOUs 209. In a case that two XBs 201 are provided in the information processing apparatus 200, the two XBs 201 have a similar function to each other. Further, the two XBs have a mutually similar connecting relation to other processing sections. When the two XBs 201 are operating normally, the two XBs 201 perform corresponding process individually. Further, when abnormality occurs in one XB 201, the XB 201 having the abnormality is disconnected by reboot of the server and the like. Alternatively, the process of the XB 201 having the abnormality is terminated, and then the other XB 201 having no abnormality processes the data transfer. The above-mentioned description has been given for the case that the XBs 201 connect each of the plurality of SBs 208 to each of the plurality of IOUs 209 in one-to-one correspondence. However, the present invention is not limited to this configuration. The SBs and the IOUs may be connected in plural-to-plural correspondence.

The status display panel 202 is connected to the operation-system log information accumulation section 300. The status display panel 202 displays information concerning the information processing apparatus 200 to, for example, a managing operator who manages the information processing apparatus 200. When power is supplied to the information processing apparatus 200 and hence the information processing apparatus 200 can perform corresponding process, the status display panel 202 turns ON a certain LED, for example, an LED "A". Further, when power is not supplied to the information processing apparatus 200 and hence the information processing apparatus 200 cannot perform corresponding process, the status display panel 202 turns OFF the LED.

The power supply unit 205 is connected to the operation-system log information accumulation section 300. The power supply unit 205 supplies power to other processing sections. The cooling fan 206 is connected to the operation-system log information accumulation section 300. The cooling fan 206 is used for cooling other apparatuses.

The SBs 208 are connected to the XBs 201 and the operation-system log information accumulation section 300. Each SB 208 has a CPU, a memory, and the like, and performs corresponding process in the information processing apparatus 200. The IOUs 209 are connected to the XBs 201 and the operation-system log information accumulation section 300. Each IOU 209 inputs and outputs data. The line switches 210 are connected to the operation-system log information accumulation section 300. Each line switch 210 is connected to the line outside the information processing apparatus 200 and realizes a switching function.

When abnormality occurs during the process such as the execution of a certain application, the SBs 208, the IOUs 209, and the line switches 210 transmit to the operation-system log information accumulation section 300 log information concerning the abnormality and an instruction of registering the log information, that is, a command for requesting the registration of the log information.

As described below, each log information accumulation section has a storage section for accumulating the log information of the process performed by the processing section. As illustrated in FIG. 2, the log information accumulation sections includes the operation-system log information accumulation section 300 and the standby-system log information accumulation section 400. The operation-system log information accumulation section 300 are connected to the standby-system log information accumulation section 400. As illustrated in FIG. 2, the operation-system log information accumulation section 300 and the standby-system log information accumulation section 400 connected to each other through a LAN in the inside of the information processing apparatus 200. While some components in FIG. 2 are described as being connected to other(s), the present invention is not limited to such configurations.

Figure 3:
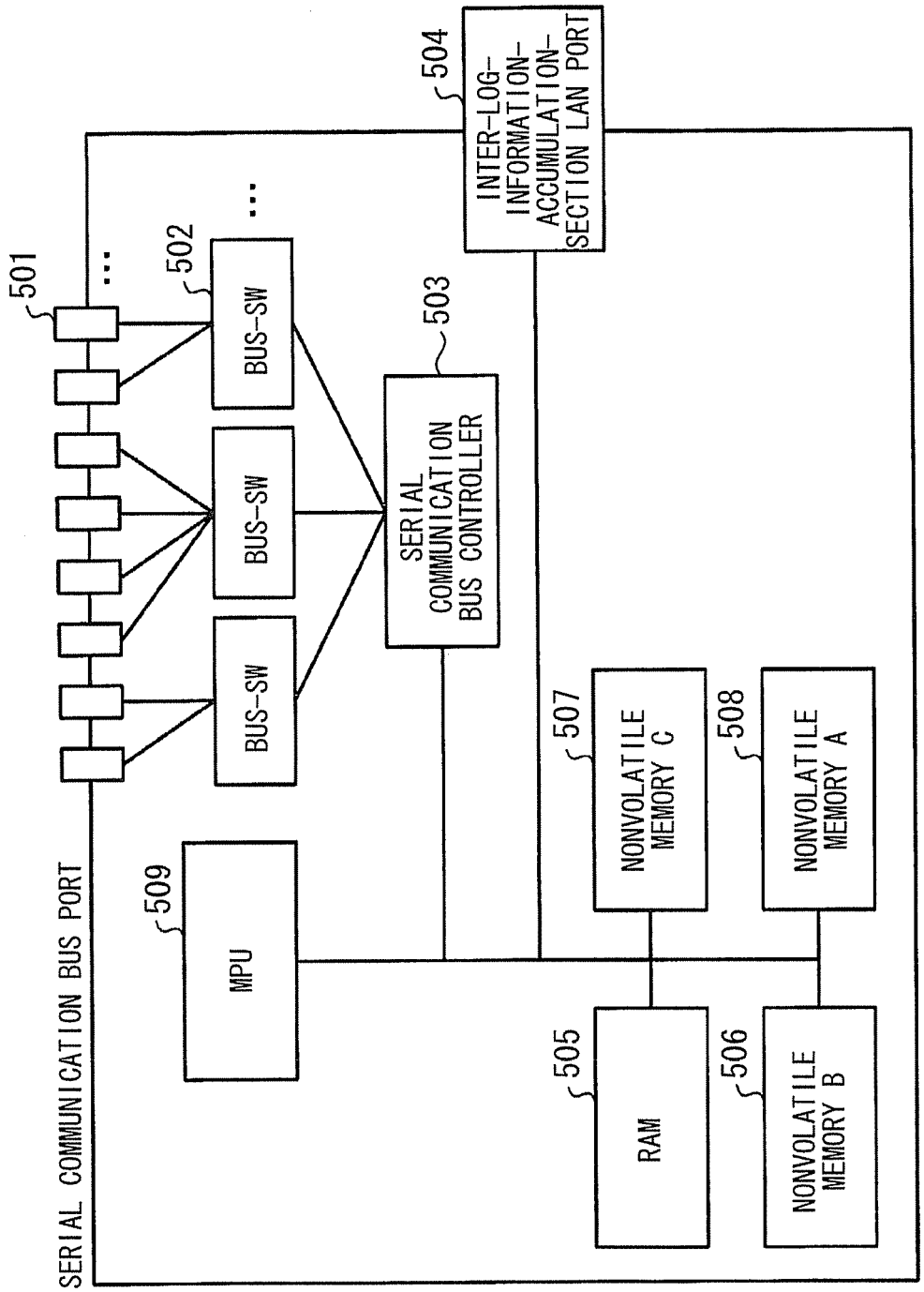
FIG. 3 illustrates a log information accumulation section.

The hardware configuration of the log information accumulation section is described below with reference to FIG. 3. FIG. 3 is a block diagram illustrating a configuration of a log information accumulation section according to an embodiment. As illustrated in FIG. 3, the log information accumulation section has serial communication bus ports 501, BUS-SWs 502, a serial communication bus controller 503, an inter-log-information-accumulation-section LAN ports 504, a RAM 505, a nonvolatile memory B 506, a nonvolatile memory C 507, a nonvolatile memory A 508, and an MPU 509.

The log information accumulation sections includes the operation-system log information accumulation section 300 and the standby-system log information accumulation section 400. In the following description, the configuration of the log information accumulation section is described with reference to FIG. 3 for a case that the operation-system log information accumulation section 300 and the standby-system log information accumulation section 400 have the same structure.

The difference between the operation-system log information accumulation section 300 and the standby-system log information accumulation section 400 according to an embodiment will be described below briefly. The standby-system log information accumulation section 400 is not connected to the individual sections provided in the information processing apparatus 200. That is, the plurality of the serial communication bus ports 501 in the standby-system log information accumulation section 400 are not connected to the individual sections in the information processing apparatus 200. Further, the operation-system log information accumulation section 300 is always provided inside the information processing apparatus 200, while information of the standby-system log information accumulation section 400 is exchanged at a fixed period.

When failure occurs in the operation-system log information accumulation section 300 so that an operation system cannot continue an operation, or alternatively when the operation-system log information accumulation section 300 is to be exchanged in accordance with an instruction of a user, the operation-system log information accumulation section 300 operates as the standby system, while the standby-system log information accumulation section 400 operates as the operation system. At that time, the plurality of serial communication bus ports 501 in the operation-system log information accumulation section 300 are disconnected from the individual sections in the information processing apparatus 200. Then, instead, the plurality of serial communication bus ports 501 in the standby-system log information accumulation section are connected to the individual sections in the information processing apparatus 200.

When abnormality occurs during the execution of the process, the standby-system log information accumulation section 400 transmits to the operation-system log information accumulation section 300 log information concerning the abnormality, and an instruction of registering the log information, that is, a command for requesting the registration of the log information.

The serial communication bus ports 501, the BUS-SWs 502, the serial communication bus controller 503, the inter-log-information-accumulation-section LAN ports 504, the RAM 505, the nonvolatile memory B 506, the nonvolatile memory C 507, the nonvolatile memory A 508, and the MPU 509 each performs corresponding process.

As illustrated in FIG. 3, the log information accumulation section has the plurality of serial communication bus ports 501 and the BUS-SWs 502.

The serial communication bus ports 501 are connected to the BUS-SWs 502 in the inside of the log information accumulation section. Further, the serial communication bus ports 501 are connected to the individual processing sections in the information processing apparatus 200 located outside the log information accumulation section. Examples of the processing sections include the XBs 201, the status display panel 202, the power supply unit 205, the cooling fan 206, the SBs 208, the IOUs 209, and the line switches 210. The plurality of serial communication bus ports 501 are connected to the individual processing sections in the information processing apparatus 200 located outside the log information accumulation section.

Each serial communication bus port 501 relays the data transmitted and received between each processing section in the information processing apparatus 200 located outside the log information accumulation section and the operation-system log information accumulation section.

The BUS-SWs 502 are connected to the serial communication bus ports 501 and the serial communication bus controller 503. Each of the plurality of BUS-SWs 502 is connected to each of the plurality of serial communication bus ports 501. Further, each BUS-SW 502 relays data transmitted and received between the serial communication bus ports 501 and the serial communication bus controller 503. Each of the BUS-SWs 502 collects information received from the individual sections in the information processing apparatus 200 by the plurality of serial communication bus ports 501 respectively, and then transmits the collected information to the serial communication bus controller 503. Further, in accordance with the information received from the serial communication bus controller 503, each BUS-SW 502 identifies a processing section to which the information is to be transmitted in the information processing apparatus 200. The BUS-SW 502 transmits the information to a serial communication bus port 501 connected to the identified processing section.

The serial communication bus controller 503 is connected to the BUS-SWs 502, the inter log information accumulation section LAN ports 504, the RAM 505, the nonvolatile memory B 506, the nonvolatile memory C 507, the nonvolatile memory A 508, and the MPU 509. The serial communication bus controller 503 relays data transmitted and received between the BUS-SWs 502 and the MPU 509.

The inter log information accumulation section LAN ports 504 are connected to the serial communication bus controller 503, the RAM 505, the nonvolatile memory B 506, the nonvolatile memory C 507, the nonvolatile memory A 508, and the MPU 509. Further, the inter log information accumulation section LAN ports 504 are connected to other log information accumulation sections. Each inter log information accumulation section LAN port 504 relays data transmitted and received between other log information accumulation sections and the MPU 509.

The RAM 505 is connected to the serial communication bus controller 503, the inter log information accumulation section LAN ports 504, the nonvolatile memory B 506, the nonvolatile memory C 507, the nonvolatile memory A 508, and the MPU 509. The RAM 505 serves as a main memory when the MPU 509 operates. Further, the RAM 505 stores temporarily log information of the individual sections in the information processing apparatus 200 inputted by the MPU 509. After the log information inputted to the RAM 505 is read, the log information is deleted by the MPU 509. Alternatively, another data is overwritten by the MPU 509.

The nonvolatile memory B 506 is connected to the serial communication bus controller 503, the inter log information accumulation section LAN ports 504, the RAM 505, the nonvolatile memory C 507, the nonvolatile memory A 508, and the MPU 509. The nonvolatile memory B 506 stores, for example, an operating system (OS) executed by the MPU 509.

The nonvolatile memory C 507 is connected to the serial communication bus controller 503, the inter log information accumulation section LAN ports 504, the RAM 505, the nonvolatile memory B 506, the nonvolatile memory A 508, and the MPU 509. The nonvolatile memory C 507 stores log information. Further, as described later, the nonvolatile memory C 507 receives the input of log information from the MPU 509, and stores the inputted log information.

The nonvolatile memory A 508, is connected to the serial communication bus controller 503, the inter log information accumulation section LAN ports 504, the RAM 505, the nonvolatile memory B 506, the nonvolatile memory C 507, and the MPU 509. The nonvolatile memory A 508 stores software for controlling the log information accumulation section. Further, the nonvolatile memory A 508 receives log information inputted from the MPU 509 and then stores the inputted log information.

As illustrated in FIG. 4, the nonvolatile memory C 507 and the nonvolatile memory A 508 store the log information inputted to the MPU 509. The nonvolatile memory C 507 and the nonvolatile memory A 508 store log information, an information source that indicates the information source of the log information and an acquisition date and time that indicates the date and time of acquisition of the log information, in a corresponding manner. In FIG. 4, the nonvolatile memory C 507 and the nonvolatile memory A 508 store the log information "voltage abnormality", the information source "power supply unit", and the acquisition date and time "2008/3/3" in a corresponding manner.

An embodiment describes a case where without requiring distinguishing between the nonvolatile memory C 507 and the nonvolatile memory A 508, the log information accumulation section stores the log information into a vacant region in any one of the nonvolatile memory C 507 and the nonvolatile memory A 508.

An embodiment describes a case that the "information source" and the "acquisition date and time" are used in a correspondence manner to the log information. However, the present invention is not limited to this configuration. For example, the "log information" may solely be used. Further, any one of the log information, the "acquisition date and time", the "information source" may be used. Alternatively, another information may be used together.

The MPU 509 is connected to the serial communication bus controller 503, the inter log information accumulation section LAN ports 504, the RAM 505, the nonvolatile memory B 506, the nonvolatile memory C 507, the nonvolatile memory A 508. The MPU 509 executes the software stored in the nonvolatile memory A 508 to control the log information accumulation sections. When log information is transmitted from the individual sections in the information processing apparatus 200 to the serial communication bus controller 503, the MPU 509 stores the transmitted log information into the RAM 505. Details of process for the log information stored in the RAM 505 are described later.

The flow of log information in the operation-system log information accumulation section 300 is described below. Log information inputted from outside of the operation-system log information accumulation section 300 to the operation-system log information accumulation section 300 is transmitted to the MPU 509 via the serial communication bus ports 501, the BUS-SWs 502, and the serial communication bus controller 503, and stored into the RAM 505. The log information stored in the RAM 505 is stored into the nonvolatile memory C 507 or the nonvolatile memory A 508 by the MPU 509.

The software configuration of the log information accumulation section is described below. For simplicity of description, the configuration of the operation-system log information accumulation section of description is described first. Then, the configuration of the standby-system log information accumulation section is described next.

The following description is given under the assumption that different kinds of software used respectively in the operation-system log information accumulation section 300 and the standby-system log information accumulation section 400 are stored in the nonvolatile memory A 508.

Although not mentioned in the following description, the following process is performed when the MPU 509 reads the software stored in the nonvolatile memory A 508 and then executes the software. In other words, software that sets forth processes described below is stored in advance in the nonvolatile memory A 508.

Figure 5:
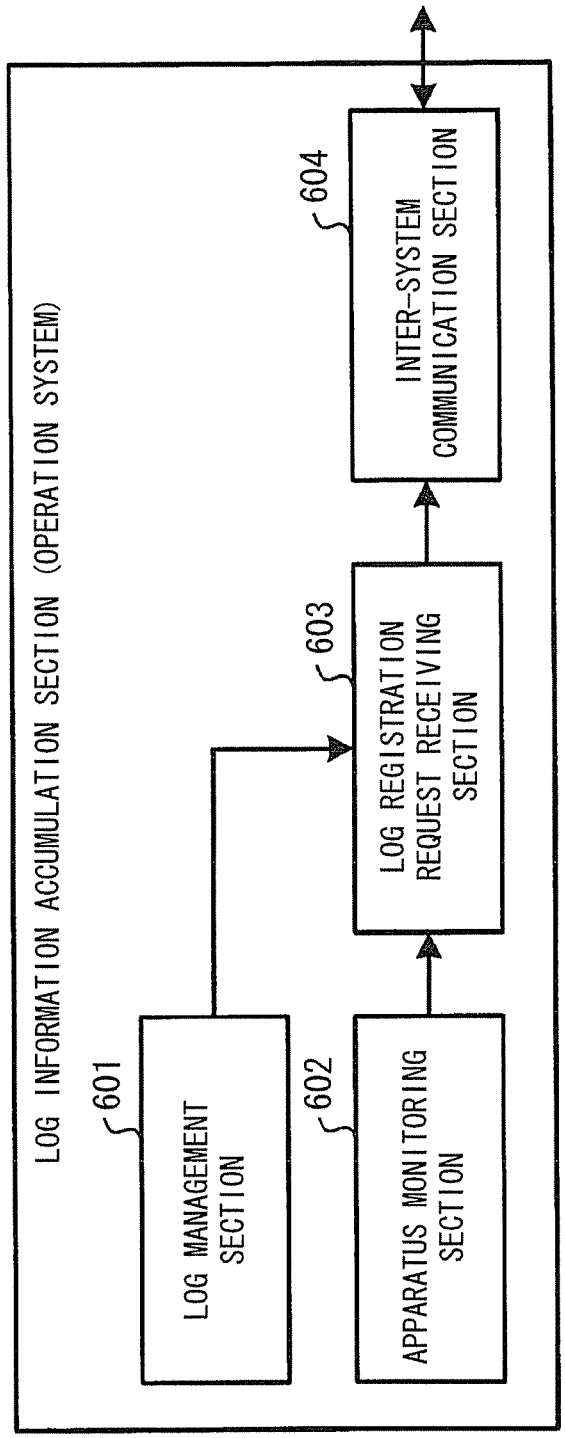
FIG. 5 illustrates an operation-system log information accumulation section.

The operation-system log information accumulation section 300 is described below with reference to FIG. 5. FIG. 5 is a block diagram illustrating a configuration of an operation-system log information accumulation section according to an embodiment. As illustrated in FIG. 5, the operation-system log information accumulation section has a log management section 601, an apparatus monitoring section 602, a log registration request receiving section 603, and an inter-system communication section 604.

The log management section 601 of the operation system acquires log information. The log management section 601 receives log information and a log information registration request from each processing section of the information processing apparatus 200. Then, at each time of reception, the log management section 601 stores the received log information into the RAM 505.

The log management section 601 receives log information and a log information registration request transmitted from the SBs 208, the IOUs 209, or the line switches 210 via the serial communication bus ports 501. The log management section 601 receives log information and a log information registration request from the standby-system log information accumulation section 400 via the inter log information accumulation section LAN ports 504.

For example, when receiving log information "application abnormal termination" and a log registration request from an IOU 209, the log management section 601 inputs into the RAM 505 the log information "application abnormal termination" and the information source "IOU" in a corresponding manner. At the time of reception of the log information and the log registration request, the log management section 601 adopts as the "acquisition date and time" the time of reception of the log information "application abnormal termination" and the log registration request, and inputs the "acquisition date and time" into the RAM 505 in a corresponding manner to the log information.

The apparatus monitoring section 602 of operation system acquires the log information. The apparatus monitoring section 602 monitors a state of each of the individual processing sections of the information processing apparatus 200 to detect abnormality. When detecting abnormality, the apparatus monitoring section 602 stores log information concerning the detected abnormality into the RAM 505 at each time of detection.

The apparatus monitoring section 602 monitors the individual processing sections of the information processing apparatus 200 that has the XBs 201, the status display panel 202, the power supply unit 205, the cooling fan 206, the SBs 208, the IOUs 209, the line switches 210, and the standby-system log information accumulation section 400. The apparatus monitoring section 602 monitors, for example, whether the voltage of each processing section of the information processing apparatus 200 has a normal value or not. At each time of detection of abnormality, the apparatus monitoring section 602 stores the detected log information into the RAM 505.

When voltage abnormality in the power supply unit 205 is detected, the apparatus monitoring section 602 stores into the RAM 505 the log information "voltage abnormality", the information source of the log information "power supply unit", and the acquisition date and time "2008/3/3".

The difference between the log information acquired by the log management section 601 and the log information acquired by the apparatus monitoring section 602 is described below briefly. The log management section 601 receives log information and a log registration request from a processing section among the individual processing sections of the information processing apparatus 200 that transmits log information to the log information accumulation section spontaneously when abnormality occurs, and thereby the log management section 601 acquires the log information. In contrast, the apparatus monitoring section 602 monitors always or periodically the individual processing sections of the information processing apparatus 200, and thereby monitors the basic states of the individual processing sections and the presence or absence of abnormality in the voltages or the like. Then, when abnormality is detected, the apparatus monitoring section 602 acquires log information.

The log registration request receiving section 603 of operation system stores the log information into the storage section. The log registration request receiving section 603 stores the log information newly acquired from the processing section of the information processing apparatus 200 into the nonvolatile memory C 507 or the nonvolatile memory A 508 provided in the operation-system log information accumulation section 300. Further, at each time that the log information is stored into the RAM 505 by the log management section 601 and the apparatus monitoring section 602, the log registration request receiving section 603 reads the log information from the RAM 505. The log registration request receiving section 603 stores the log information read from the RAM 505 into the nonvolatile memory C 507 or the nonvolatile memory A 508 provided in the operation-system log information accumulation section 300.

Further, the log registration request receiving section 603 transmits the log information read from the RAM 505 to the inter-system communication section 604 of the operation system.

The inter-system communication section 604 of the operation system transmits the newly acquired log information to the another log information accumulation section. The inter-system communication section 604 receives from the log registration request receiving section 603 the log information newly acquired from the processing section of the information processing apparatus 200. The inter-system communication section 604 transmits the received new log information to the log registration request receiving section 704 of standby system.

The inter-system communication section 604 transmits to the another log information accumulation sections all log information accumulated in the nonvolatile memory C 507 or the nonvolatile memory A 508 provided in the operation-system log information accumulation section 300. The inter-system communication section 604 receives the acquisition request, and transmits the log information accumulated in the nonvolatile memory C 507 or the nonvolatile memory A 508 provided in the operation-system log information accumulation section, to the another log information accumulation sections serving as the transmitting sources of the acquisition request, that is, to the standby-system log information accumulation section 400.

The inter-system communication section 604 receives an acquisition request from the standby-system log information accumulation section 400. The inter-system communication section 604 reads all log information stored in the nonvolatile memory C 507 or the nonvolatile memory A 508 provided in the operation-system log information accumulation section 300 at the time of reception of the acquisition request. The inter-system communication section 604 transmits all read-out log information to the standby-system log information accumulation section 400 having transmitted the acquisition request.

The following description is given for an exemplary case that the nonvolatile memory C 507 or the nonvolatile memory A 508 provided in the operation-system log information accumulation section 300 stores a set of the log information "voltage abnormality", the information source "power supply unit", and the acquisition date and time "2008/3/3", and a set of the log information "application abnormal termination", the information source "IOU", and the acquisition date and time "2008/3/5". The inter-system communication section 604 receives an acquisition request from the standby-system log information accumulation section 400. The inter-system communication section 604 reads from the nonvolatile memory C 507 or the nonvolatile memory A 508 provided in the operation-system log information accumulation section 300 the set of the log information "voltage abnormality", the information source "power supply unit", and the acquisition date and time "2008/3/3", and the set of the log information "application abnormal termination", the information source "IOU", and the acquisition date and time "2008/3/5". The inter-system communication section 604 transmits to the standby-system log information accumulation section 400 the set of the log information "voltage abnormality", the information source "power supply unit", and the acquisition date and time "2008/3/3", and the set of the log information "application abnormal termination", the information source "IOU", and the acquisition date and time "2008/3/5" which have been read.

Figure 6:
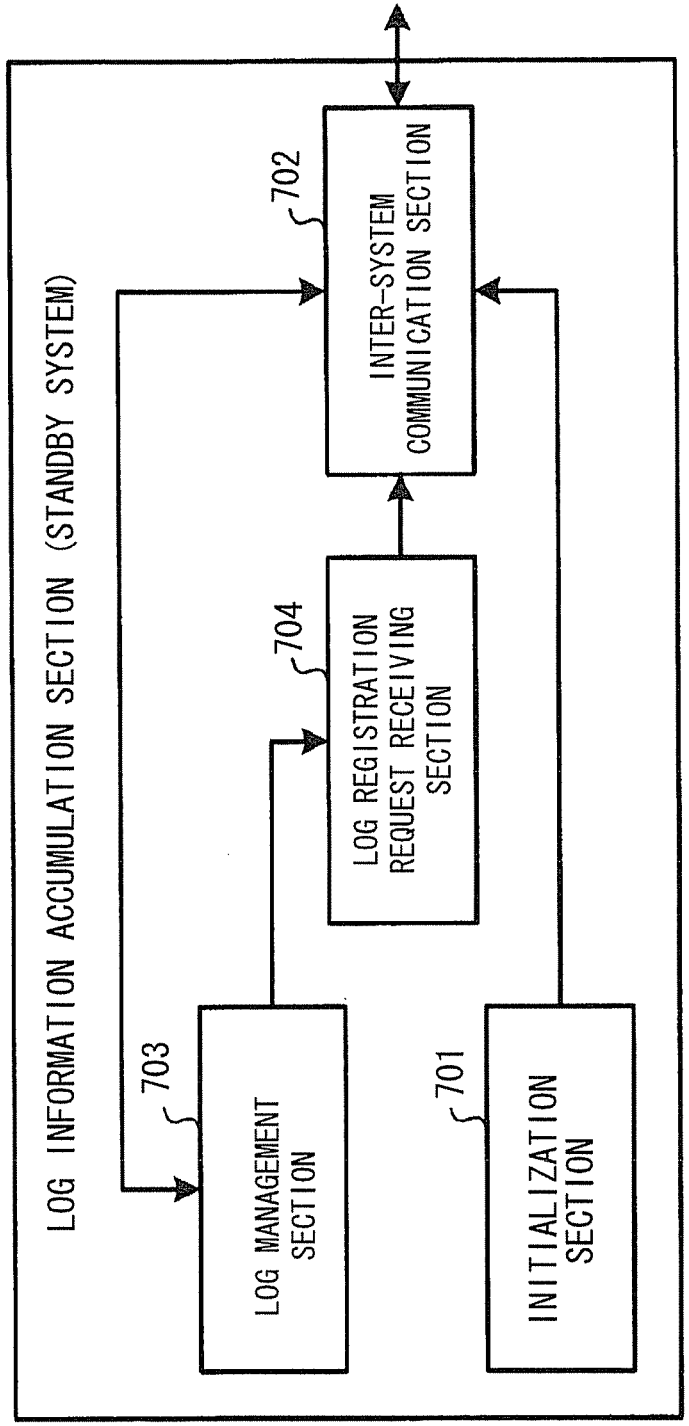
FIG. 6 illustrates a standby-system log information accumulation section.

The standby-system log information accumulation section 400 is described below with reference to FIG. 6. FIG. 6 is a block diagram illustrating a configuration of a standby-system log information accumulation section according to an embodiment. As illustrated in FIG. 6, the standby-system log information accumulation section 400 has a log management section 703, a log registration request receiving section 704, an inter-system communication section 702, and an initialization section 701.

At the time of startup of the standby-system log information accumulation section 400, the initialization section 701 of standby system transmits an acquisition request to the operation-system log information accumulation section 300, that is, to the inter-system communication section 604, via the inter-system communication section 702. The startup indicates, for example, a point in time that the existing standby-system log information accumulation section 400 is exchanged so that a new standby-system log information accumulation section 400 is connected to the information processing apparatus 200, or alternatively a point in time that power is initially supplied to the information processing apparatus 200 so that the information processing apparatus 200 has started up. It is assumed that at the time of startup, no log information is accumulated in the nonvolatile memory C 507 or the nonvolatile memory A 508 provided in the standby-system log information accumulation section 400 corresponding to the startup.

The inter-system communication section 702 of standby system relays an acquisition request to be transmitted from the initialization section 701 to the operation-system log information accumulation section 300.

The inter-system communication section 702 transmits to the log management section 703 of the standby system the log information transmitted from the operation-system log information accumulation section 300 to the standby-system log information accumulation section 400. In response to the acquisition request transmitted from the initialization section 701, the inter-system communication section 702 receives the log information transmitted from the operation-system log information accumulation section 300. The inter-system communication section 702 transmits the received log information to the log management section 703.

The inter-system communication section 702 receives the log information newly acquired and transmitted by the operation-system log information accumulation section 300. The inter-system communication section 702 transmits the received log information to the log management section 703.

The log management section 703 of the standby system stores into the RAM 505 the log information transmitted from the inter-system communication section 702. The log management section 703 receives from the inter-system communication section 702: the log information transmitted from the operation-system log information accumulation section 300 in response to the acquisition request; and the log information newly acquired and transmitted by the operation-system log information accumulation section 300. The log management section 703 stores the received log information into the RAM 505.

The log registration request receiving section 704 of the standby system stores the log information transmitted from the operation-system log information accumulation section 300 into the nonvolatile memory C 507 or the nonvolatile memory A 508 provided in the standby-system log information accumulation section 400. The log registration request receiving section 704 reads the log information stored into the RAM 505 by the log management section 703, and stores the read-out log information into the nonvolatile memory C 507 or the nonvolatile memory A 508 provided in the standby-system log information accumulation section 400.

In an embodiment, the log management section 703 has stored into the RAM 505 the log information transmitted from the operation-system log information accumulation section 300 in response to the acquisition request and the log information newly acquired and transmitted by the operation-system log information accumulation section 300.

The log registration request receiving section 704 reads from the RAM 505 the log information transmitted from the operation-system log information accumulation section 300 in response to the acquisition request, and stores the log information into the nonvolatile memory C 507 or the nonvolatile memory A 508 provided in the standby-system log information accumulation section 400. After storing data, the log registration request receiving section 704 reads from the RAM 505 the log information newly acquired and transmitted by the operation-system log information accumulation section 300, and stores the log information into the nonvolatile memory C 507 or the nonvolatile memory A 508 provided in the standby-system log information accumulation section 400.

The log registration request receiving section 704 determines whether initialization processing has been performed or not, that is, whether at the time of startup of the standby-system log information accumulation section 400, acquiring of all log information stored in the storage section provided in the operation-system log information accumulation section has been performed or not. In other words, the log registration request receiving section 704 determines whether or not the log information transmitted from the operation-system log information accumulation section 300 in response to the acquisition request has been stored into the nonvolatile memory C 507 or the nonvolatile memory A 508 provided in the standby-system log information accumulation section 400.

When the log registration request receiving section 704 determines that the initialization processing is not yet completed, until the initialization processing is completed, the log registration request receiving section 704 does not store the log information newly acquired and transmitted by the operation-system log information accumulation section 300, into the nonvolatile memory C 507 or the nonvolatile memory A 508 provided in the standby-system log information accumulation section 400. On the other hand, when the log registration request receiving section 704 determines that the initialization processing has been completed, the log registration request receiving section 704 stores the log information newly acquired and transmitted by the operation-system log information accumulation section 300, into the nonvolatile memory C 507 or the nonvolatile memory A 508 provided in the standby-system log information accumulation section 400.

The process performed by the information processing apparatus is described below with reference to FIGS. 7 to 11. Description is given for the flow of initialization process, the flow of new log information transmission process, and the flow of new log information storing process.

Figure 7:
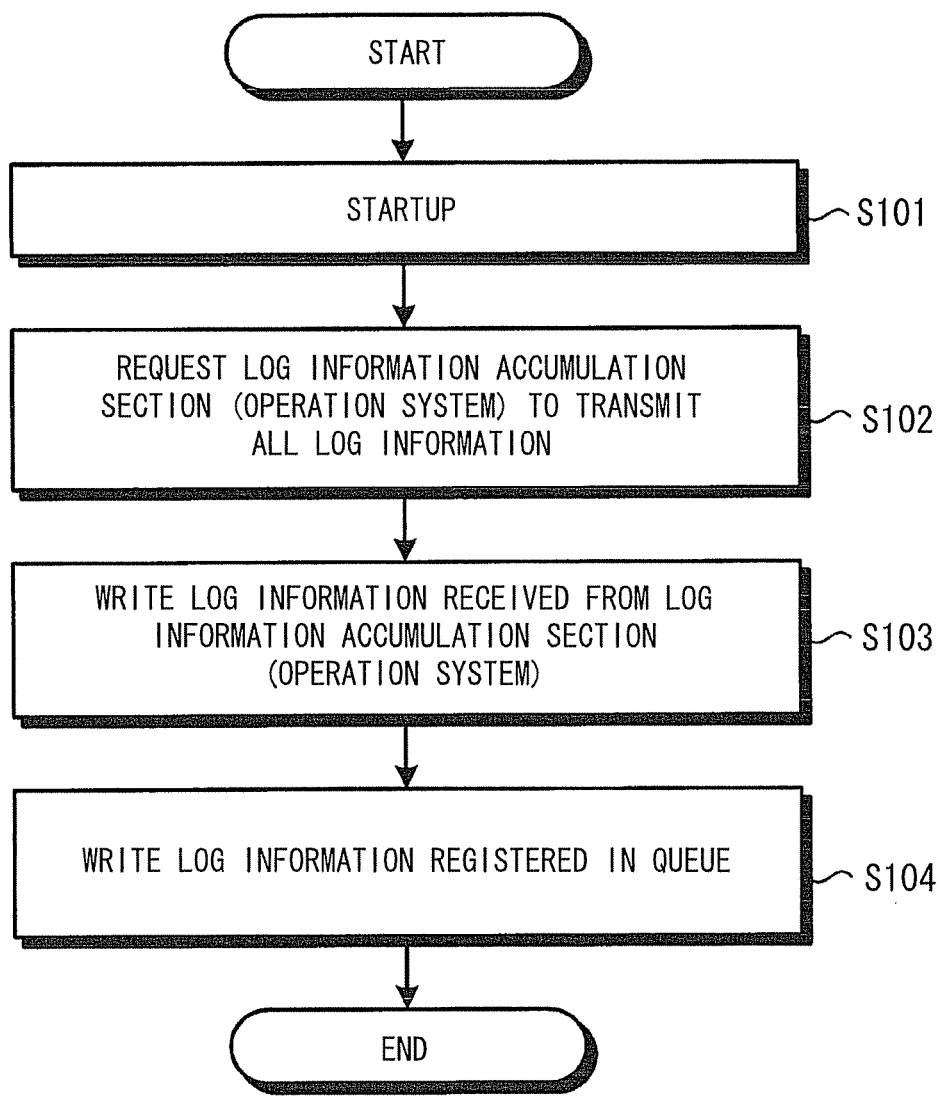
FIG. 7 illustrates an initialization process performed by an information processing apparatus.
Figure 8:
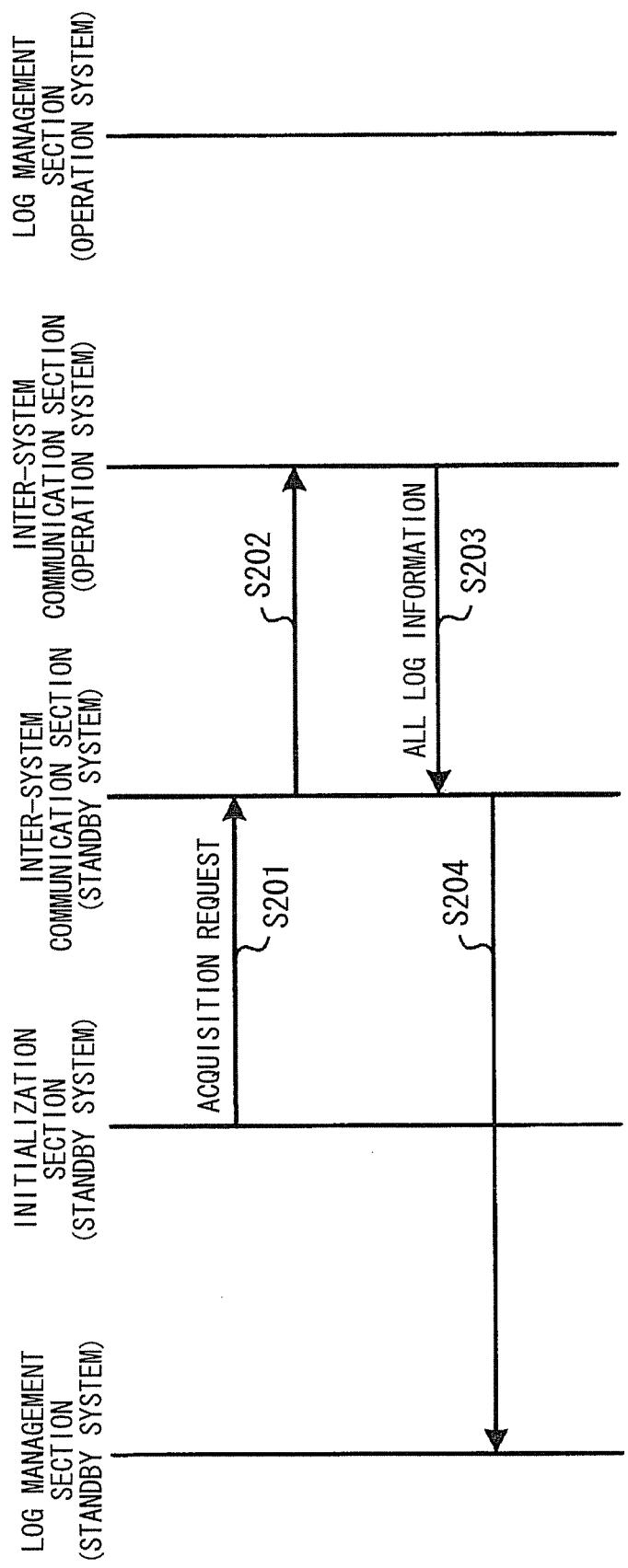
FIG. 8 illustrates an initialization process performed by an information processing apparatus.
Figure 9:
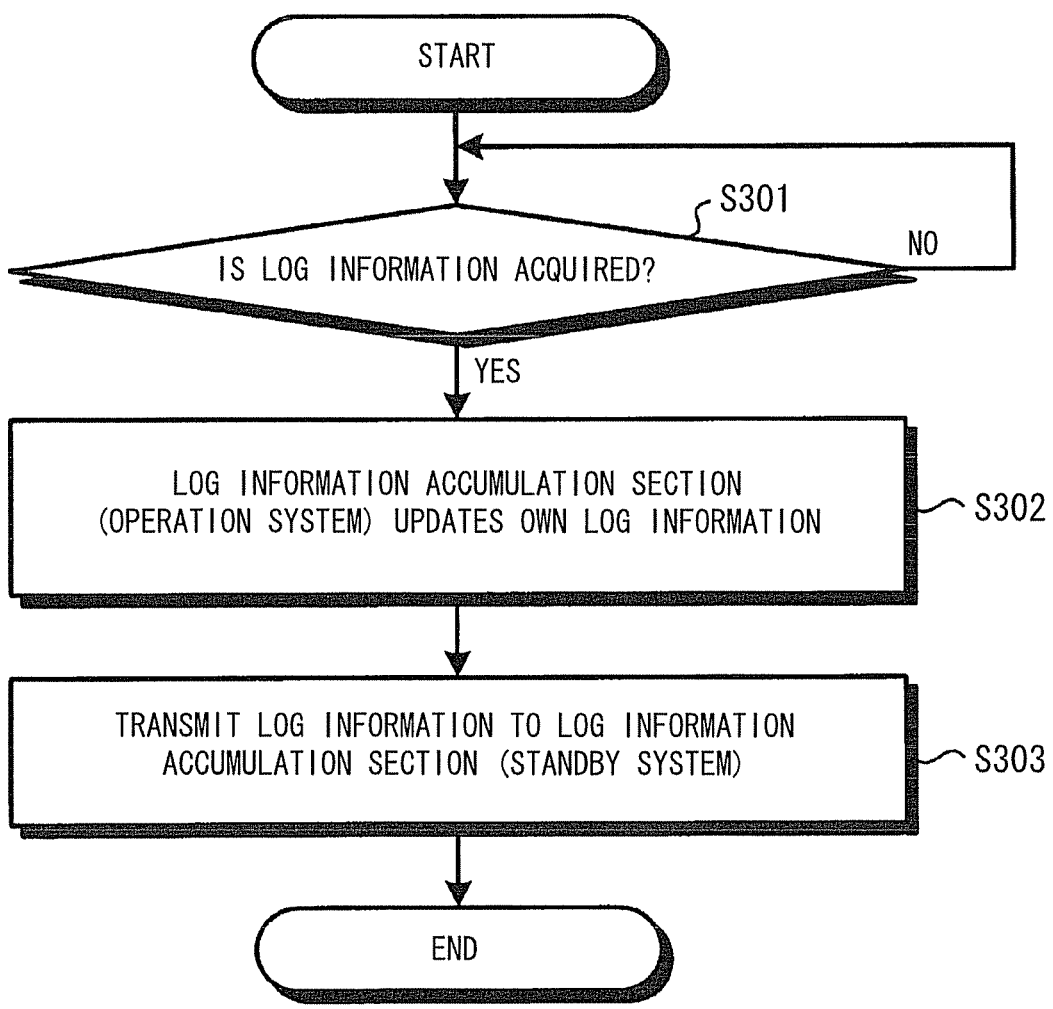
FIG. 9 illustrates a flow chart of a new log information transmission process performed by an information processing apparatus.
Figure 10:
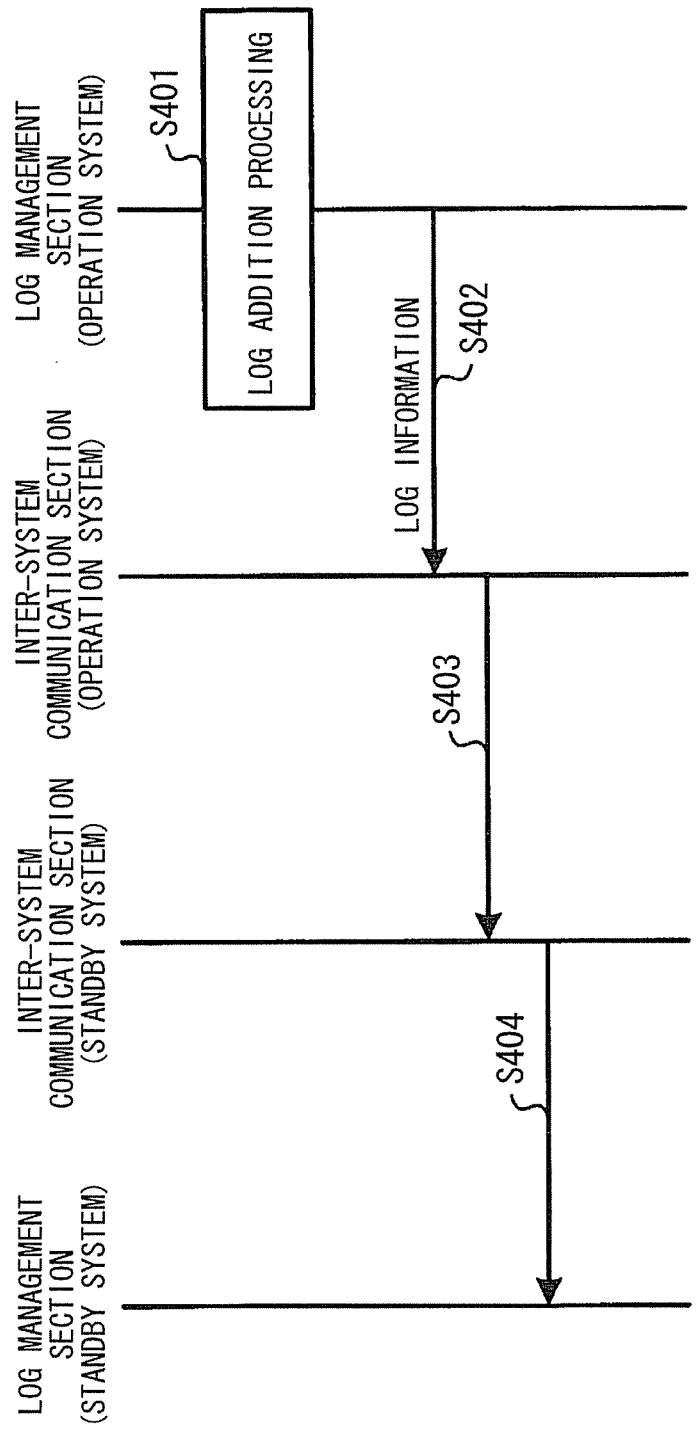
FIG. 10 illustrates a sequence diagram of new log information transmission performed by an information processing apparatus.

FIG. 7 is a flow chart illustrating an initialization process performed by the information processing apparatus according to an embodiment. FIG. 8 is a sequence diagram illustrating an initialization process performed by the information processing apparatus according to an embodiment. FIG. 9 is a flow chart illustrating a new log information transmission process performed by the information processing apparatus according to an embodiment. FIG. 10 is a sequence diagram illustrating a new log information transmission performed by an information processing apparatus according to an embodiment. FIG. 11 is a flow chart illustrating a new log information storing process performed by the information processing apparatus according to an embodiment.

The initialization process performed by the information processing apparatus 200 (FIG. 2) is described below with reference to FIGS. 7 and 8. The initialization process indicates process that at the time of startup, the standby-system log information accumulation section 400 acquires all log information stored in the storage section provided in the operation-system log information accumulation section 300.

As illustrated in FIG. 7, when the standby-system log information accumulation section 400 has started up (S101), the initialization section 701 requests the operation-system log information accumulation section 300 to transmit all log information (S102). As shown in S201 and S202 in FIG. 8, the initialization section of the standby system transmits an acquisition request to the operation-system log information accumulation section 300 via the inter-system communication section.

In the standby-system log information accumulation section 400, the log management section 703 writes the log information received from the operation-system log information accumulation section 300 (S103). As shown with respect to S203 and S204 in FIG. 8, in the operation-system log information accumulation section, all log information is transmitted from the inter-system communication section to the log management section of the standby system. In the standby-system log information accumulation section 400, the log management section 703 stores into the RAM 505 all log information received from the operation-system log information accumulation section 300.

In the standby-system log information accumulation section 400, the log registration request receiving section 704 writes into the storage section the log information registered in the queue (RAM 505) (S104). The log registration request receiving section 704 reads the log information stored in the RAM 505, that is, the log information transmitted from the operation-system log information accumulation section 300 in response to the acquisition request, and stores the read-out log information into the nonvolatile memory C 507 or the nonvolatile memory A 508 provided in the standby-system log information accumulation section 400. Further, upon completion of writing data into the storage section, the log registration request receiving section 704 deletes from the queue the log information registered in the queue. When no log information is registered in the queue, the write process is not generated that the log registration request receiving section 704 stores the read-out log information into the nonvolatile memory C 507 or the nonvolatile memory A 508.

The new log information transmitting process performed by the information processing apparatus 200 is described below with reference to FIG. 9 and FIG. 10.

As illustrated in FIG. 9, in the operation-system log information accumulation section 300, when new log information is acquired by the log management section 601 (S301 Yes), the operation-system log information accumulation section 300 updates the log information stored in the corresponding nonvolatile memory C 507 or its own nonvolatile memory A 508 (S302). The log registration request receiving section 603 stores the new log information acquired by the log management section 601 or the apparatus monitoring section 602.

The operation-system log information accumulation section 300 transmits the newly acquired log information to the standby-system log information accumulation section 400 (S303). As shown as S401 in FIG. 10, when the log information acquired by the log management section 601 or the apparatus monitoring section 602 is stored, the log information is transmitted to the log management section of the standby system via the inter-system communication section of the operating system and the inter-system communication section of the standby system as shown as S402 to S404 of FIG. 10.

The process for storing new log information into the nonvolatile memory C 507 or the nonvolatile memory A 508 provided in the standby-system log information accumulation section 400 is described below with reference to FIG. 11.

As illustrated in FIG. 11, in the standby-system log information accumulation section 400, when new log information is received (S501 Yes), the received log information is stored into the queue (RAM 505) (S502). When receiving new log information from the operation-system log information accumulation section via the inter-system communication section 702, the log management section of the standby system stores the log information into the RAM 505.

The log registration request receiving section 704 determines whether initialization process has been completed (S503). When the log registration request receiving section 704 determines that initialization process has been completed (S503 Yes), the log registration request receiving section 704 reflects all log information registered in the queue into the corresponding log information (S504). The log registration request receiving section 704 reads the log information that has been newly acquired and transmitted by the operation-system log information accumulation section 300 and that is accumulated in the RAM 505, and stores the log information into the nonvolatile memory C 507 or the nonvolatile memory A 508 provided in the standby-system log information accumulation section 400. Further, upon completion of writing data into the storage section, the log registration request receiving section 704 deletes from the queue the log information registered in the queue.

On the other hand, when the log registration request receiving section 704 determines that initialization is not yet completed (S503 No), the log registration request receiving section of the standby system terminates the new log information storing process. The log registration request receiving section 704 is not required to store the log information that has been newly acquired and transmitted by the operation-system log information accumulation section 300 and that is accumulated in the RAM 505, into the nonvolatile memory C 507 or the nonvolatile memory A 508 provided in the standby-system log information accumulation section 400. This is because the storing process is performed in the initialization process at operation S104.

According to an embodiment, without requiring monitoring of the operation-system log information accumulation section to determine whether the standby-system log information accumulation section has started up or not, the data stored in the operation-system log information accumulation section and the data stored in the standby-system log information accumulation section can be synchronized with each other. This, for example, reduces the process load of synchronization.

According to a typical information processing apparatus, whether a standby-system log information accumulation section has started up or not is always monitored. Then, only when the standby-system log information accumulation section has started up, the log information acquired by the operation-system log information accumulation section is transmitted to the standby-system log information accumulation section. Then, the standby-system log information accumulation section stores the transmitted log information into the storage section, so that the log information is synchronized between the operation-system log information accumulation section and the standby-system log information accumulation section.

In contrast, in the information processing apparatus according to an embodiment, at the time of startup, the standby-system log information accumulation section acquires all log information stored in the operation-system log information accumulation section at the time, and stores the log information into the storage section. In the information processing apparatus of an embodiment, when the standby-system log information accumulation section is exchanged and a new the standby-system log information accumulation section is inserted, or alternatively when power is initially supplied to the information processing apparatus so that the information processing apparatus has started up, all log information stored in the operation-system log information accumulation section is acquired and stored into the storage section.

The operation-system log information accumulation section of an embodiment transmits newly acquired log information to the standby-system log information accumulation section at each time of acquisition. Thus, the standby-system log information accumulation section acquires the log information acquired by the operation-system log information accumulation section after the initialization process, and then stores the log information into the storage section.

In the information processing apparatus of an embodiment, without monitoring the operation-system log information accumulation section to determine whether the standby-system log information accumulation section has started up, the log information stored in the storage section of the standby-system log information accumulation section can be synchronized with the log information stored in the storage section of the operation-system log information accumulation section.

According to an embodiment, at each time that log information is transmitted, the standby-system log information accumulation section stores once the log information into the cache, and then stores the log information stored in the cache after initialization. According to an embodiment, without loosing the log information transmitted from the operation-system log information accumulation section, the standby-system log information accumulation section can store the log information into the storage section of the standby-system log information accumulation section.

The present invention may be implemented in various modes other than the embodiment described above. Thus, another embodiment is described below.

The described embodiment is related to a case that the operation-system log information accumulation section 300 and the standby-system log information accumulation section 400 has the same structure. However, the present invention is not limited to this configuration. The two log information accumulation sections may have mutually different structures. For example, a standby-system log information accumulation section need not to have the serial communication bus ports 501, the BUS-SWs 502, and the serial communication bus controller 503.

The described embodiment is related to a case that different kinds of software used respectively in the operation-system log information accumulation section 300 and the standby-system log information accumulation section 400 are stored in the nonvolatile memory A 508. However, the present invention is not limited to this configuration. For example, the operation-system log information accumulation section and the standby-system log information accumulation section may store the same software in a nonvolatile memory A 508, and may execute process by using necessary software.

The described embodiment is related to a technique that after initialization process, the standby-system log information accumulation section 400 stores into the storage section the log information newly acquired by the operation-system log information accumulation section 300. However, the present invention is not limited to this configuration. For example, the standby-system log information accumulation section may execute simultaneously in parallel to each other: the initialization process; and the process for storing into the storage section the log information newly acquired by the operation-system log information accumulation section 300.

The process procedure(s), the control procedure(s), the detailed name(s), and the information including various kinds of data and parameters described above may be changed including arbitrarily.

The individual components of the individual apparatuses illustrated in the described embodiment are function-conceptual ones. Thus, they need not physically be constructed exactly as illustrated above. The detailed mode of distribution or integration of the individual apparatuses is not limited to the illustrated one. All or a part of the individual apparatuses may be distributed or integrated functionally or physically in arbitrary units in accordance with various kinds of loads, operating conditions, and the like. For example, the information processing apparatus 200 may have a processing section other than the processing sections shown in FIGS. 2, 3, 5, and 6.

The described embodiment is related to a case that hardware logic realizes the various kinds of process(es). However, the present invention is not limited to this configuration. That is, the process may be implemented when a program prepared in advance is executed by a computer. For example, log information may be synchronized between two computers when a program prepared in advance is executed by the computers.

An example of a computer that executes a program for implementing a function similar to that of the log information accumulation section shown in the described embodiment is described below with reference to FIG. 12. FIGS. 12A and 12B are diagrams describing program(s) provided in a log information accumulation section according to an embodiment.

Figure 12A:
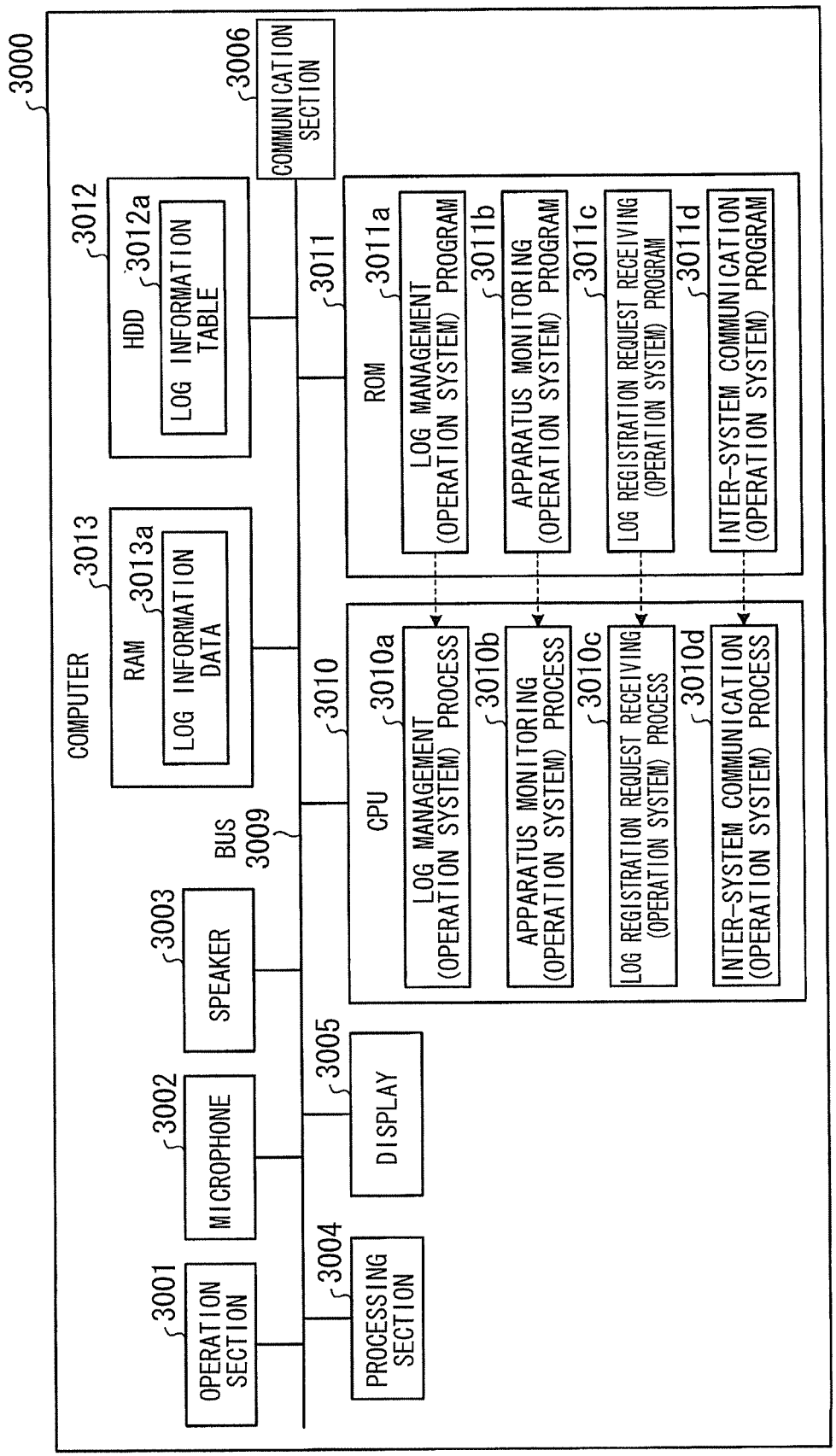
FIGS. 12A and 12B illustrate programs provided in a log information accumulation section.

As illustrated in FIG. 12A, in a computer 3000 serving as a log information accumulation section, an operation section 3001 is connected to a microphone 3002, a speaker 3003, a processing section 3004, a display 3005, a communication section 3006, a CPU 3010, a ROM 3011, an HDD 3012, and a RAM 3013 with each other through a bus 3009 and the like.

The ROM 3011 stores, in advance, control program(s) that realize function(s) similar to those of the log management section 601, the apparatus monitoring section 602, the log registration request receiving section 603, and the inter-system communication section 604 that are described. As shown in FIG. 12A, the ROM 3011 stores a log management program 3011a, an apparatus monitoring program 3011b, a log registration request receiving program 3011c, and an inter-system communication program 3011d. Similarly to the individual components of the log information accumulation section shown in FIGS. 5 and 6, these programs 3011a to 3011d may be integrated with each other or alternatively may be separated from each other depending on the necessity. Further, while FIG. 12A is described with respect to programs 3011a to 3011d, all or part of the operation(s) may be performed using a single program stored in the ROM 3011.

When the CPU 3010 reads the programs 3011a to 3011d from the ROM 3011 and then executes the programs, the programs 3011a to 3011d realize a log management process 3010a, an apparatus monitoring process 3010b, a log registration request receiving process 3010c, and an inter-system communication process 3010d of operation system as shown in FIG. 12A.

A log information table 3012a is provided in the HDD 3012. The log information table 3012a corresponds to the contents of the nonvolatile memory C 507 and the nonvolatile memory A 508 shown in FIG. 3.

The CPU 3010 reads the log information table 3012a and stores the table into the RAM 3013. Then, by using the log information data 3013a stored in the RAM 3013, the CPU 3010 executes a log information accumulation program.

Figure 12B:
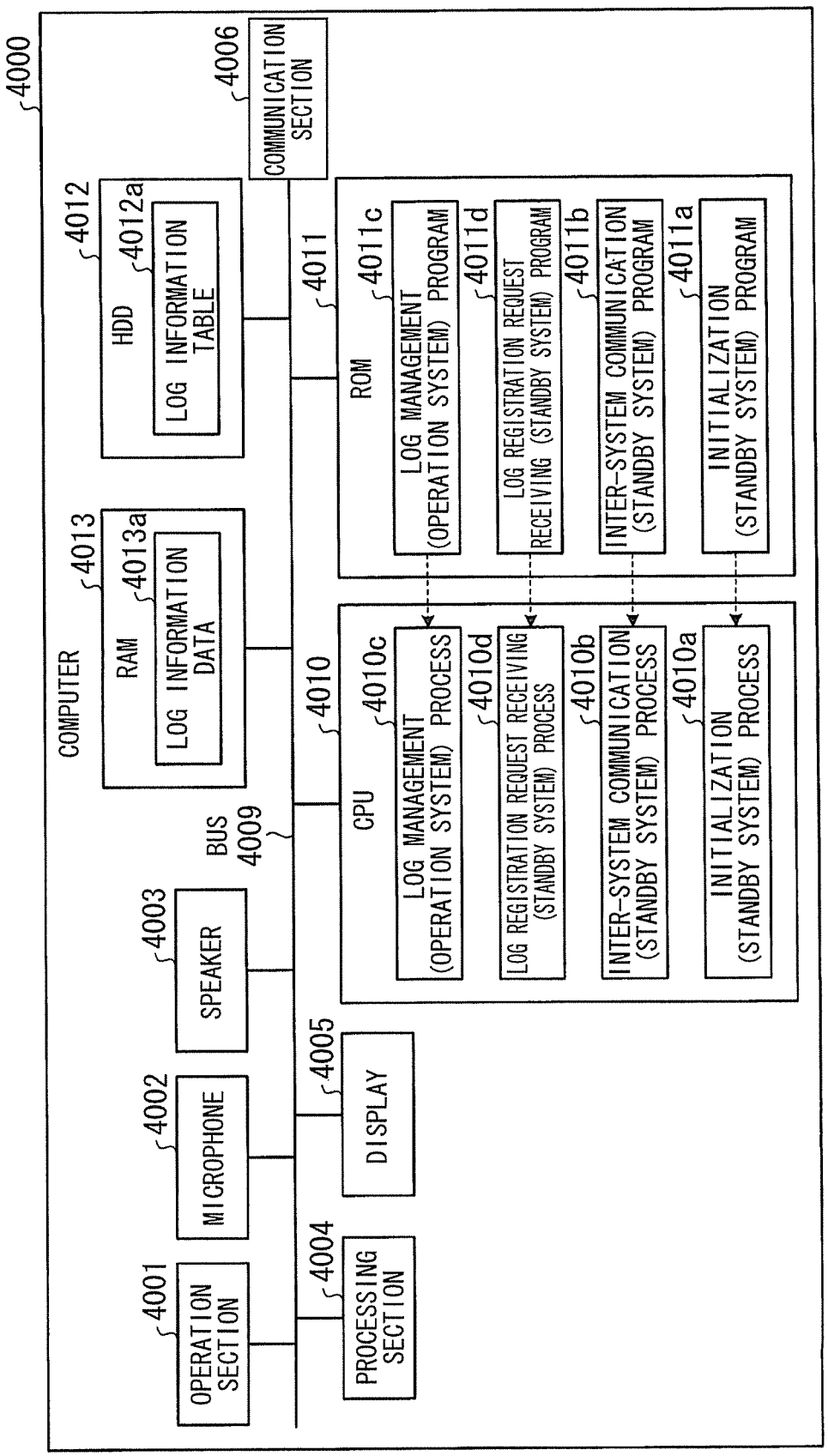

As illustrated in FIG. 12B, in a computer 4000 serving as a log information accumulation section, an operation section 4001 is connected to a microphone 4002, a speaker 4003, a processing section 4004, a display 4005, a communication section 4006, a CPU 4010, a ROM 4011, an HDD 4012, and a RAM 4013 with each other through a bus 4009 and the like.

The ROM 4011 stores control program(s) that realize function(s) similar to those of the initialization section 701, the inter-system communication section 702, the log management section 703, and the log registration request receiving section 704 as described above. As shown in FIG. 12B, the ROM 4011 stores in advance an initialization program 4011a, an inter-system communication program 4011b, a log management program 4011c, and a log registration request receiving program 4011d. Similarly to the individual components of the log information accumulation section shown in FIGS. 5 and 6, these programs 4011a to 4011d may be integrated with each other or alternatively may be separated from each other depending on the necessity. As mentioned previously, the operations of the computer are not limited to being performed by any particular number of program(s).

When the CPU 4010 reads the programs 4011a to 4011d from the ROM 4011 and then executes the programs, the programs 4011a to 4011d realize an initialization process 4010a, an inter-system communication process 4010b, a log management process 4010c, and a log registration request receiving process 4010d as shown in FIG. 12B.

A log information table 4012a is provided in the HDD 4012. Here, the log information table 4012a corresponds to the contents stored in the nonvolatile memory C 507 and the nonvolatile memory A 508 shown in FIG. 3.

The CPU 4010 reads the log information table 4012a and stores the table into the RAM 4013. Then, by using the log information data 4013a stored in the RAM 4013, the CPU 4010 executes a log information accumulation program.

The information processing apparatus described above may be realized when a program prepared in advance is executed by a computer such as a personal computer and a workstation. The program can be distributed through a network such as the Internet from the other device that stores such program. Further, the program may be recorded in a computer-readable recording medium such as a hard disk, a flexible disk (FD), a CD-ROM, an MO, and a DVD, and then may be read from the recording medium and executed by a computer.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An information processing apparatus, comprising:
a processor that performs a process; and
a plurality of history information accumulation units each accumulating history information concerning the process performed by the processor, the processor executing:
storing history information acquired by the processor into a storage of a first unit of the plurality of information accumulation units,
transmitting the history information stored in the storage of the first unit to a second unit of the plurality of history information accumulation units in response to a request for the history information generated by the second unit at a time of a startup operation of the second unit,
transmitting, from the first unit to the second unit, updated history information when new history information is acquired,
storing the history information transmitted from the first unit into a first storage of the second unit, the history information being transmitted from the first unit in response to one of a startup operation and in response to each acquisition request, and
storing the updated history information in the second unit.

2. The information processing apparatus according to claim 1, wherein the second unit includes:
a second storage that stores the updated history information, and
the processor updates the history information stored in the first storage of the second unit with the updated history information.

3. An information processing method to control an information processing apparatus, the information processing method comprising:
storing history information newly acquired from one of a plurality of processing sections into a first storage section provided in a first history information accumulation section that accumulates history information concerning a process performed by said one processing section of the plurality of processing sections;
transmitting an acquisition request to request acquisition of history information accumulated into the first storage section;
transmitting the history information accumulated in the first storage section to another history information accumulation section having transmitted the acquisition request;
transmitting the history information to the other history information accumulation section when newly acquiring history information from said one processing section of the plurality of processing sections;
transmitting the acquisition request to the first history information accumulation section at a time of startup; and
storing the transmitted history information into a second storage section provided in a second history information accumulation section, where the history information is transmitted to the second storage section in response to one of a startup operation and in response to each acquisition request.

4. A non-transitory computer-readable recording medium having therein a history information accumulation section control program for causing a computer to execute operations, comprising:
storing history information newly acquired from one of a plurality of processing sections into a first storage section provided in a first history information accumulation section that accumulates history information concerning a process performed by said one processing section of the plurality of processing sections;
transmitting an acquisition request for requesting acquisition of history information accumulated into the first storage section;
transmitting the history information accumulated in the first storage section to another history information accumulation section having transmitted the acquisition request;
transmitting the history information to the other history information accumulation section when newly acquiring history information from said one processing section of the plurality of processing sections;
transmitting the acquisition request to the first history information accumulation section at a time of startup; and
storing the transmitted history information into a second storage section provided in a second history information accumulation section, where the history information is transmitted to the second storage section in response to one of a startup operation and in response to each acquisition request.

5. A method of information processing method, comprising:
- storing history information in a first storage connected with multiple processors, the history information corresponding with a processing performed by at least one of the multiple processors;
- transmitting the history information to a connected second storage responsive to one of an acquisition request for the history information from any of the multiple processors and at a startup operation;
- storing the history information in the connected second storage;
- transmitting, from the first storage to the connected second storage, newly acquired history information when new history information becomes available to the first storage without waiting for another acquisition request or detection of another startup operation; and
- storing the newly acquired history information in the connected second storage.

6. The method according to claim 5, wherein the transmitting of the history information occurs upon an initial startup of the connected second storage.

* * * * *